(12) United States Patent
Fan

(10) Patent No.: US 7,672,507 B2
(45) Date of Patent: Mar. 2, 2010

(54) IMAGE PROCESSING METHODS AND SYSTEMS

(75) Inventor: Jian Fan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1472 days.

(21) Appl. No.: 10/768,461

(22) Filed: Jan. 30, 2004

(65) Prior Publication Data

US 2005/0169531 A1 Aug. 4, 2005

(51) Int. Cl.
*G06K 9/00* (2006.01)
*G06K 9/48* (2006.01)

(52) U.S. Cl. ..................... 382/164; 382/199; 382/162

(58) Field of Classification Search ........... 382/100, 382/103, 151, 199, 205, 162–173, 276, 281; 358/538
See application file for complete search history.

(56) References Cited

U.S. PATENT DOCUMENTS

| | | | |
|---|---|---|---|
| 5,796,868 A * | 8/1998 | Dutta-Choudhury | 382/199 |
| 5,933,523 A * | 8/1999 | Drisko et al. | 382/151 |
| 6,094,508 A | 7/2000 | Acharya et al. | |
| 6,516,097 B1 | 2/2003 | Pritt | |
| 6,697,497 B1 * | 2/2004 | Jensen et al. | 382/100 |
| 6,807,286 B1 * | 10/2004 | Krumm et al. | 382/103 |
| 7,085,401 B2 * | 8/2006 | Averbuch et al. | 382/103 |
| 2002/0114518 A1 * | 8/2002 | Wilt | 382/199 |

OTHER PUBLICATIONS

Canny, John, "A Computational Approach to Edge Detection", IEEE Transactions on Pattern Analysis and Machine Intelligence, vol. PAMI-8, No. 6, Nov. 1986, pp. 679-697.
O'Rourke, Joseph, "Computational Geometry in C", Second Edition, Cambridge University Press, 1994, pp. 252-262.
Forsyth, David A. et al., "Computer Vision: A Modern Approach", Chapter 8, Edge Detection, pp. 176-181, Aug. 2002.
Manber, Udi, "Introduction to Algorithms: A Creative Approach", Addison-Wesley Publishing, pp. 190-191, Jan. 1989.
McLean, G.F., "Geometric Correction of Digitized Art", Graphical Models and Image Processing, vol. 58, No. 2, Mar. 1996, pp. 142-154.
Ruzon, Mark A. et. al., "Edge, Junction, and Corner Detection using Color Distributions", IEEE Transactions on Pattern Analysis and Machine Intelligence, vol. 23, No. 11, Nov. 2001, pp. 1281-1295.

* cited by examiner

*Primary Examiner*—Samir A. Ahmed
*Assistant Examiner*—Mehdi Rashidian

(57) ABSTRACT

Systems and methods according to the present invention provide techniques to reliably detect edges, lines and quadrilaterals, especially those with low local contrast, in color images. Edges can be detected using a color gradient operator is based on color distance with a non-linear weight determined by the consistency of local gradient orientations, thereby significantly improving the signal/noise ratio. In detecting lines, a variant of the Gradient Weighted Hough Transform can be used employing both the edge strength and orientation. Multiple non-overlapping quadrilaterals can be detected using a process which includes quality metrics (for both individual quadrilaterals and for a set of non-overlapping quadrilaterals) and a graph-searching method.

38 Claims, 13 Drawing Sheets

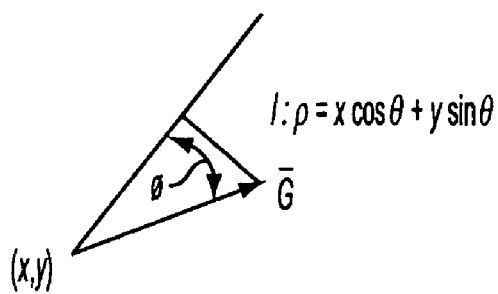
FIG. 5C
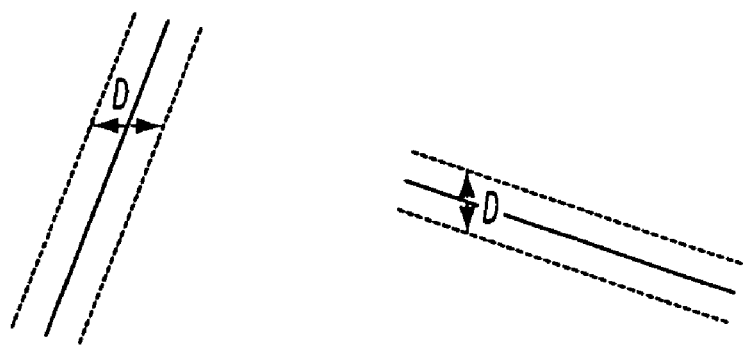
FIG. 5D
FIG. 5E FIG. 5F

IMAGE PROCESSING METHODS AND SYSTEMS

BACKGROUND

The present invention relates generally to image processing systems and, more particularly, to methods and systems for detecting edges, lines and shapes within images.

Edge detection is a technique used to, among other things, segment images in image processing applications. An edge of an image may be defined by, for example, the degree of change in intensity between a first region of pixels and second region of pixels. Along the boundary between the two regions, a group of pixels on either side may be classified as edge pixels. The classification of pixels as belonging to an edge has many applications in image processing, e.g., image enhancement and pattern recognition which can be used in optical character recognition (OCR) applications. Such applications typically depend upon the success of the edge detection process in order to achieve acceptable output quality.

One approach for performing edge detection is to consider an edge as a change in the intensity level (luminance) from one pixel or region to another. In addition to computing the change(s) in intensity level using, e.g., a gradient, an edge detector typically employs a threshold value that indicates whether a given intensity value change can be classified as representing an edge or non-edge region or pixel. A comparison between the threshold and a measured intensity change is used to determine whether a pixel belongs to an edge or not. Most threshold-based edge detectors use a predetermined threshold value that is fixed for an entire image and which may also be applied to every image generated by a particular imaging device or process. Using a high threshold value in edge detection is problematic when confronted with low contrast areas within the image being processed. For example, consider an image being processed which has a shadowed region and another region which receives more direct lighting (non-shadowed). Both the shadowed region and the non-shadowed region contain the same edge feature. In the shadowed region, the measured pixel luminance values will typically reflect less change in intensity than corresponding pixel measurements in the non-shadowed region, since the measured intensity values will be in a lower and narrower range than the measured intensity values for the same edge feature in the non-shadowed region. As a result, if a high threshold value is used, edge features present in low contrast regions of the image may be erroneously classified as non-edge features.

In addition to edge detection, some image processing applications also perform line detection. Lines can, for example, be considered higher level elements and, once identified, can be used to identify shapes within the image. One technique which can be used to perform line detection is the Hough transform. The Hough transform can detect a line representing an object boundary despite the presence of surrounding noise in the image. The Hough transform assigns a locus curve to the (i,j) coordinates of each pixel value having an intensity which corresponds to that of a line condition. The locus curve for each of these pixels corresponds to a polar coordinate transformation of the (i,j) coordinates for each such pixel. A line used to represent the boundary in the image is then obtained by finding the polar coordinates of a point where the curves representing the loci concentrate. However, conventional implementations of the Hough transform do not fully utilize edge strength and orientation.

SUMMARY

Systems and methods according to the present invention provide techniques to reliably detect edges, lines and quadrilaterals, especially those with low local contrast, in color images. Edges can be detected using a color gradient operator that is based on color distance with a non-linear weight determined by the consistency of local gradient orientations, thereby significantly improving the signal/noise ratio. In detecting lines, a variant of the Gradient Weighted Hough Transform can be used employing both the edge strength and orientation. Multiple non-overlapping quadrilaterals can be detected using a process which includes quality metrics (for both individual quadrilaterals and for a set of non-overlapping quadrilaterals) and a graph-searching method.

According to an exemplary embodiment of the present invention, a method for image processing includes the steps of determining, for each of a plurality of different color channels, a channel gradient and a weighting factor associated with each color channel in an image, setting, for each pixel, a color gradient equal to one of the channel gradients having a maximum weighted magnitude, preliminarily identifying edges in the image by determining local maxima using the color gradients, and confirming the edges using at least one threshold.

According to another exemplary embodiment of the present invention, a method for image processing includes the steps of identifying a first set of candidate shapes in an image based on line data, screening the first set of candidate shapes against predetermined criteria to generate a second set of candidate shapes, determining at least one confidence level for each of the second set of candidate shapes and eliminating those of the second set of candidate shapes wherein the at least one confidence level is less than a predetermined value.

BRIEF DESCRIPTION OF THE DRAWINGS

The accompanying drawings illustrate exemplary embodiments of the present invention, wherein:

FIGS. 5(a)-5(h) show various aspects of line detection according to exemplary embodiments of the present invention;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
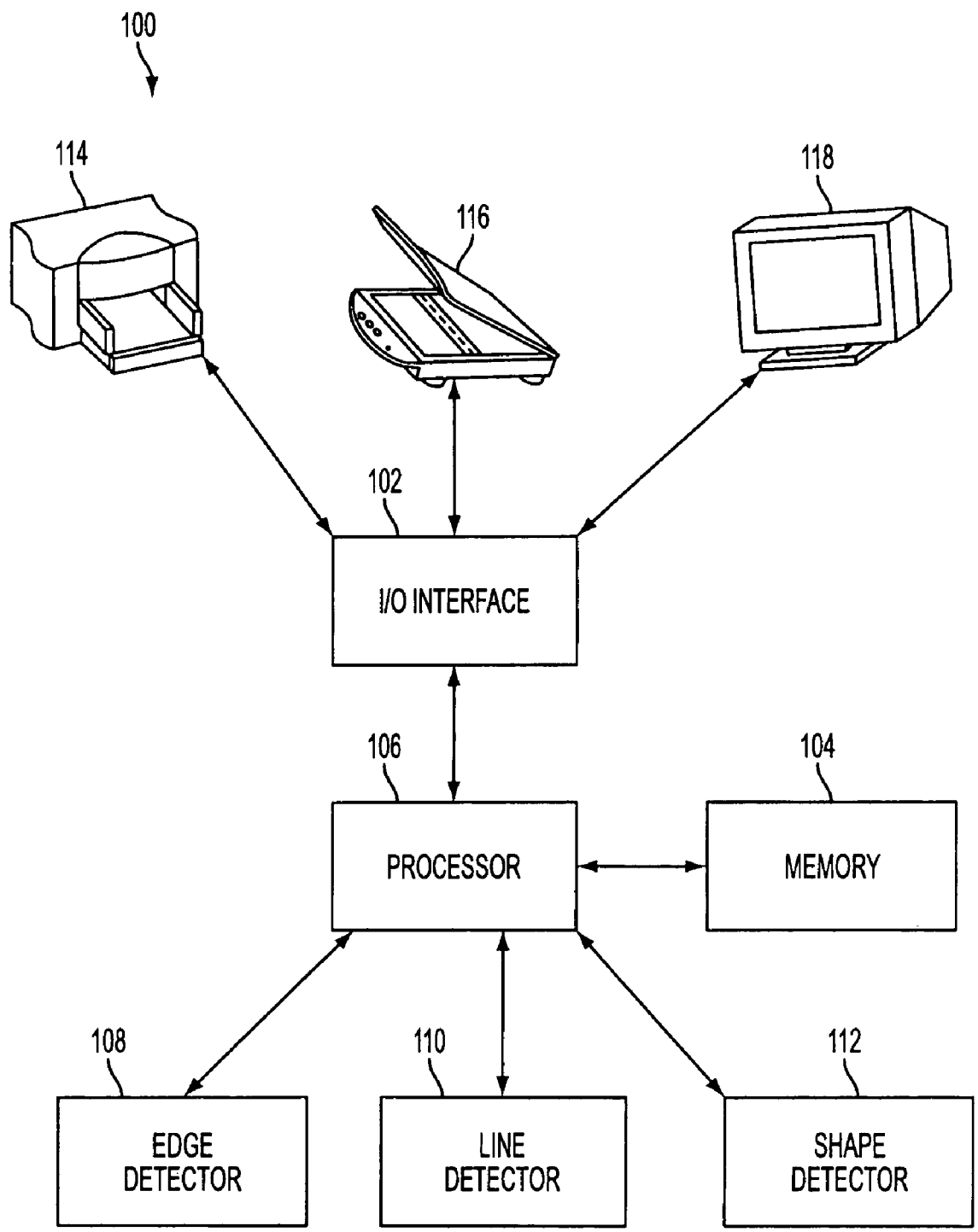
FIG. 1 depicts an exemplary image processing system.

In order to provide some context for this discussion, an image processing system according to an exemplary embodiment of the present invention will first be described with respect to FIG. 1. Therein, an image processing system 100 includes an I/O interface 102 and a memory device 104 that are connected to a processor 106. These components can be packaged together in, for example, a personal computer. The image processing system 100 further includes an edge detector 108, a line detector 10 and a shape detector 112 which are connected to processor 106. Although the components 102-112 are illustrated in FIG. 1 as separate components of the image processing system 100, two or more of these components may be integrated, thereby decreasing the number of components included in the image enhancing system. Additionally, the components 108-112 may be implemented in any combination of hardware, firmware and software. According to one exemplary embodiment, components 108-112 can be implemented as a software program(s) that perform the functions of the components 108-112, as described below, when executed by the processor 106. Scanner 116 is connected via I/O interface 102 to capture images for processing by image processing system 100. The I/O interface may be a USB port, a serial port or any other interface port that is designed to interface the scanner 116 to the image processing system 100. Alternatively, the I/O interface 102 may be a network interface to receive digital images from a local network (not shown) or from the Internet (not shown). Additionally, other devices, e.g., a digital camera (not shown), may be connected via I/O interface 102 to capture images for processing by image processing system 100. Printer 114 and monitor 118 are connected to the image processing system 100 via I/O interface 102 to provide output devices for, e.g., the processed image data.

Detection of lines and quadrilaterals are common objectives for various image processing and computer vision applications such as vanishing point detection, correction of geometric distortion and auto-cropping. An overall flow diagram associated with a method of processing to determine non-overlapping quadrilaterals from an image (including edge detection and line detection) according to an exemplary embodiment of the present invention is provided as FIG. 2. Therein, at step 200, an image captured by, e.g., scanner 116 can be sub-sampled to speed up processing time. Next, at step 202, the sub-sampled image is smoothed in order to, e.g., remove noise prior to subsequent processing. Then, edge detection is performed using color information at step 203, followed by line detection at step 204. Shapes, e.g., quadrilaterals, are identified and verified at step 206 prior to a set of mutually non-overlapping quadrilaterals being selected at step 208. Each of these steps is described in more detail below.

The sub-sampling step 202 is an optional step which is intended to speed-up the computations since it reduces the amount of data to be processed. Those skilled in the art will appreciate, however, that while sub-sampling can increase the processing speed, it will reduce the resolution and, therefore, the accuracy of edge/line/shape detection according to the present invention. Thus the particular choice of whether to sub-sample and what sub-sampling factor to use if sub-sampling is performed will be implementation specific and the present invention is intended to encompass all such implementations. The sub-sampling factor can, for example, be determined according to the size of the target image and the input image resolution. For the purposes of the illustrative embodiments described herein consider that an input image is designated $P_0$ Then, a sub-sampled image $P_1$ can be generated by, for example, dividing the image $P_0$ into an N×N grid. For each such grid, pixel values (e.g., r,g,b, respectively) are generated based on an average of the N×N corresponding values. The integer N is the sub-sampling factor. According to one, purely illustrative embodiment, the sub-sampling factor is set to the integer value of the minimum input image dimension (width and height) divided by 200.

The smoothing step 202 can be performed by, for example, applying a lowpass filter to the sub-sampled image $P_1$. A Gaussian lowpass filter of size (2m+1)-by-(2m+1) can be implemented using the following formula:

$$f_{i,j} = ke^{-\alpha^2(i^2+j^2)/m^2}, \quad -m \leq i \leq m, \ -m \leq j \leq m$$

Where m is an odd integer and k is a normalizing factor such that $$\sum_{i,j} f_{i,j} = 1.0.$$

In one purely illustrative embodiment, m=1 and α=1.3.

Figure 3:
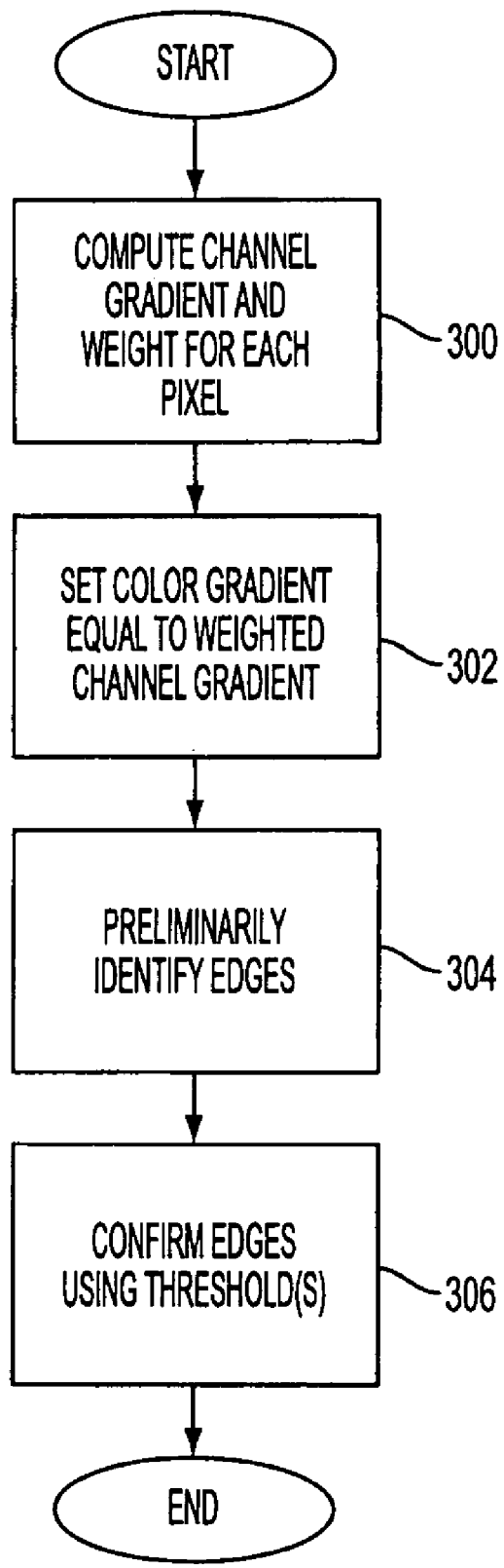
FIG. 3 is a flowchart showing an edge detection method according to an exemplary embodiment of the present invention.
Figure 4A:
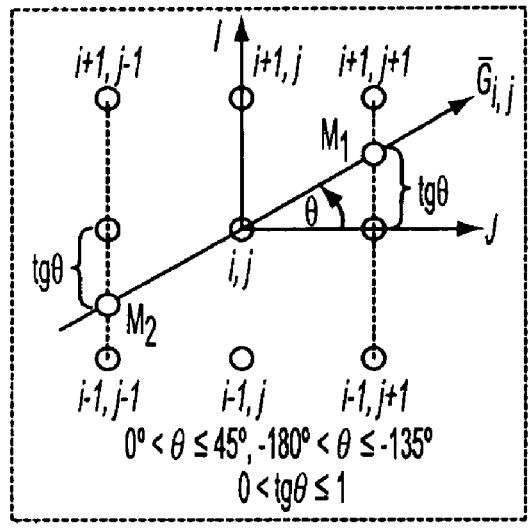
FIGS. 4(a)-4(d) illustrate steps associated with color gradient calculation according to exemplary embodiments of the present invention.
Figure 4B:
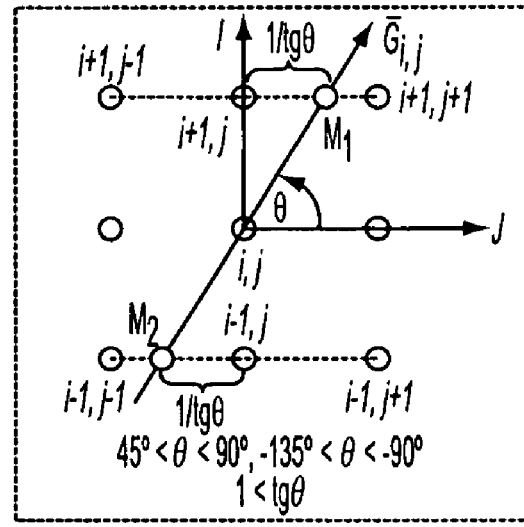
Figure 4C:
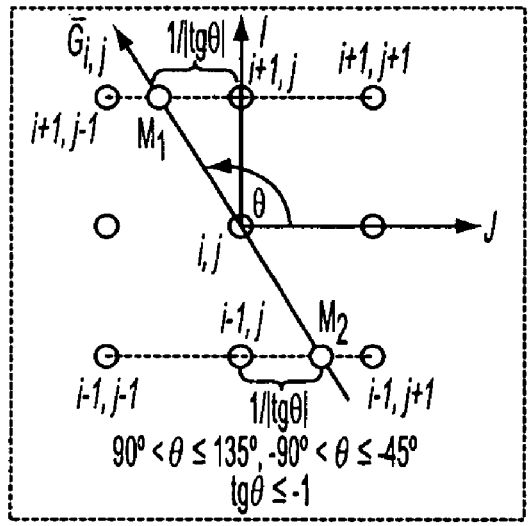
Figure 4D:
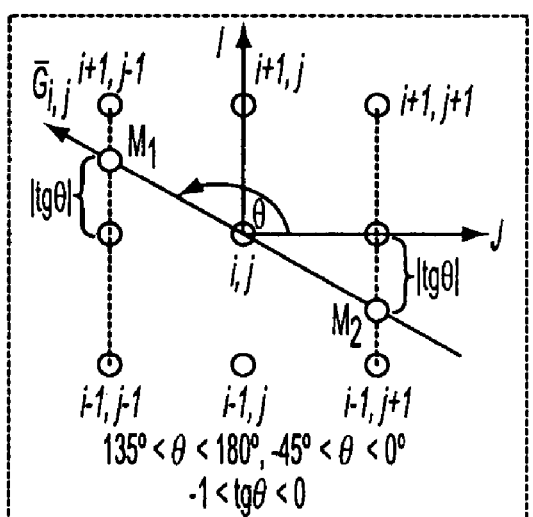

According to exemplary embodiments of the present invention, edge detection step 203 involves analyzing color information associated with the input image. This can, for example, be accomplished by performing the sub-steps depicted in the flowchart of FIG. 3. First, at step 300, a channel gradient is computed using color attribute information for each pixel in the input image $P_0$ or working image $P_1$ (if sub-sampling is employed). The channel gradient can, for example, be computed as follows. For each pixel location (i,j), a channel gradient (magnitude M and orientation θ) for each color channel c (representing R, G, B, respectively) is computed as:

$$d_I = [(c_{i+1,j-1} + 2c_{i+1,j} + c_{i+1,j+1}) - (c_{i-1,j-1} + 2c_{i-1,j} + c_{i-1,j+1})]/4.0$$

$$d_J = [(c_{i+1,j+1} + 2c_{i,j+1} + c_{i-1,j+1}) - (c_{i+1,j-1} + 2c_{i,j-1} + c_{i-1,j-1})]/4.0$$

$$M_{i,j}^c = \sqrt{d_I \cdot d_I + d_J \cdot d_J}, \quad \theta_{i,j}^c = \arctan(d_J/d_I)$$

The weights are computed separately for each color channel c using the image data of that channel only For a pixel location (i,j), a threshold $T_c$ is set up which is proportional to the magnitude of the channel gradient $T_c = kM_{i,j}^c$, where k (0<k<1) is a real number. Let the orientation angle of the central pixel (i,j) be $\theta_{i,j}^c$. A standard deviation $\sigma_c$ of the orientation distribution is then computed for the pixels whose channel gradient magnitude is above $T_c$ within the 3×3 window:

$$\sigma_c = \begin{cases} \sqrt{\dfrac{\sum_{n=1}^{N}(\Delta\theta_n - \overline{\Delta\theta})^2}{(N-1)}}, & N > 1 \\ 0, & \text{otherwise} \end{cases}$$

where $\Delta\theta$ is the angle difference between a qualified pixel ($M_{i,j}{}^c > T_c$) and $\theta_{i,j}{}^c$ (in radial unit) in the range of $[-\pi,\pi]$:

$$\Delta\theta = \begin{cases} (\theta - \theta_{i,j}^c), & |\theta - \theta_{i,j}^c| \le \pi \\ (\theta - \theta_{i,j}^c) - 2\pi, & (\theta - \theta_{i,j}^c) > \pi \\ (\theta - \theta_{i,j}^c) + 2\pi, & (\theta - \theta_{i,j}^c), < -\pi \end{cases}$$

The weight is then computed as: $w_c = \lambda e^{-\sigma_c^2/\mu}$, where $\lambda$ and $\mu$ are two parameters. In an exemplary, but purely illustrative, implementation, k=0.1, $\lambda$=1.2 and $\mu$=0.5. Note that since edge detection according to exemplary embodiments of the present invention employ color gradient operators based on $L_\infty$ color distance with a non-linear weight determined by the consistency of local gradient orientations, the signal/noise ratio associated with the edge determination process is significantly improved. In this regard, note that the Minkowski distance between two colors $(r_0,g_0,b_0)$ and $(r_1,g_1,b_1)$ is calculated by $d_n = (|r_0-r_1|^n + |g_0-g_1|^n + |b_0-b_1|^n)^{1/n}$. Setting $n \to \infty$ (referred to as the $L_\infty$ norm), the $L_\infty$ distance becomes $d_\infty = \max(|r_0-r_1|, |g_0-g_1|, |b_0-b_1|)$. The above weights are calculated in a 3×3 color window, however those skilled in the art will appreciate that a larger window can be employed.

Having calculated the color gradient and weights, the next sub-step 302 in this exemplary edge detection process is, for each pixel location (i,j), to set the color gradient $\vec{G}$ to be the weighted channel gradient (magnitude and orientation) with the maximum magnitude among the channels, i.e., $$\vec{G} = \max_{|u|}\{(w_r \nabla r), (w_g \nabla g), (w_b \nabla b)\}$$

Next, edges (points associated with local maxima) can be preliminarily identified from the gradient using, e.g., a non-maximum suppression technique, at step 304. As shown graphically in FIGS. 4(a)-4(d), the first operation in an exemplary nonmaximum suppression technique is to interpolate the magnitudes of the gradient at two points in the gradient. The gradient $\vec{G}$ can be represented by a vertical component $G^I$ and a horizontal component $G^J$. This interpolation process can be performed algorithmically as, for example:

```
If (G_{i,j}^I == 0) then M_1 = M_{i,j-1} and M_2 = M_{i,j+1}
Else If (G_{i,j}^J == 0) then M_1 = M_{i-1,j} and M_2 = M_{i+1,j}
Else
    tgθ = G_{i,j}^I / G_{i,j}^J ;
    If (tgθ ≦ -1) then M_1 = (1 + 1/tgθ)M_{i+1,j} - (1/tgθ)·M_{i+1,j-1} and M_2 =
        (1 + 1/tgθ)M_{i-1,j} - (1/tgθ)·M_{i-1,j+1} ;
    Else If (-1 < tgθ < 0 ) then
        M_1 = (1 + tgθ)M_{i,j-1} - tgθ · M_{i+1,j-1} and M_2 = (1 + tgθ)M_{i,j+1} -
        tgθ · M_{i-1,j+1};
    Else if (0 < tgθ ≦ 1) then
        M_1 = (1 - tgθ)M_{i,j+1} + tgθ · M_{i+1,j+1} and M_2 = (1 - tgθ)M_{i,j-1} +
        tgθ · M_{i-1,j-1} ;
    Else if (tgθ > 1) then
        M_1 = (1 - 1/tgθ)M_{i+1,j} + (1/tgθ) · M_{i+1,j+1} and M_2 = (1 - 1/tgθ)M_{i-1,j} +
        (1/tgθ) · M_{i-1,j-1}.
    Endif
Endif
```

Once the interpolation is completed, then for pixels where $M_{i,j} > M_1$ and $M_{i,j} \geq M_2$ the pixel at location (i,j) is preliminarily designated as an edge pixel. Otherwise that pixel is designated as a non-edge pixel. An edge contains 1) its location (i,j) in the image coordinate, 2) strength, and 3) orientation.

Confirming (or rejecting) preliminary edge (points associated with local maxima) classification can be accomplished using one or more thresholds at step 306. According to an exemplary embodiment of the present invention, a two-threshold hysteresis technique with an orientation constraint is used to confirm edge classification. Initially every edge pixel is considered unconfirmed. Then, starting from each unconfirmed edge pixel whose color gradient magnitude is larger than a high threshold $T_H$, a path is traced which follows all of that pixel's 8-connectivity neighbor edges recursively. For each edge pixel encountered during the path tracing, if that pixel's gradient magnitude is larger than the low threshold $T_L$ and the orientation difference $\Delta\theta = |\theta - \theta_0|$ with the starting edge is smaller than a threshold $\Delta\theta_{max}$, the edge pixel is confirmed (marked) as an edge pixel and its neighbors are similarly traced. Otherwise, when a pixel is reached having a magnitude less than $T_L$ or with an orientation difference which is larger than $\Delta\theta_{max}$, the pixel is reclassified as a non-edge pixel and the tracing along this path stops. After this process ends, any remaining, unconfirmed edge pixels are reclassified as non-edge pixels. In one exemplary, and purely illustrative, embodiment the thresholds can be set as: $T_H=9$, $T_L=4$ and $\Delta\theta_{max}=15$ degrees.

Figure 2:
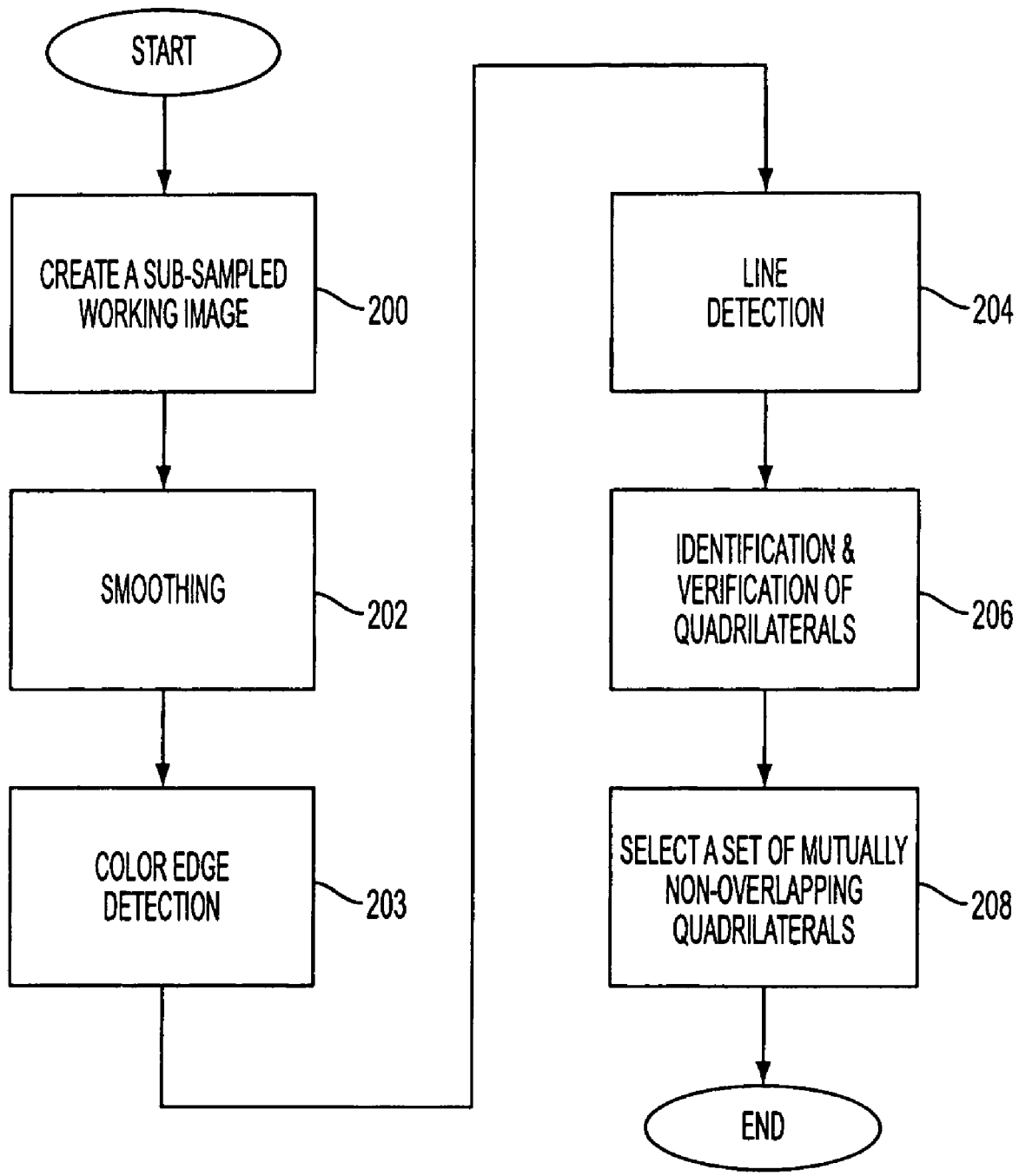
FIG. 2 is a flowchart showing an image processing method according to an exemplary embodiment of the present invention.

Having completed edge detection, the flow in FIG. 2 then moves on to the line detection step 204. The edge detection step 202 results in stored edge values including a (weighted) magnitude and orientation for each edge. Line detection step 204 can, for example, be accomplished using soft-thresholding and a Gradient Weighted Hough Transform (GWHT) that takes into account edge magnitude and orientation as well as line length. More specifically, line detection according to exemplary embodiments of the present invention can be accomplished by local peak detection in the Hough transform domain following line verification in edge domain.

Figure 5A:
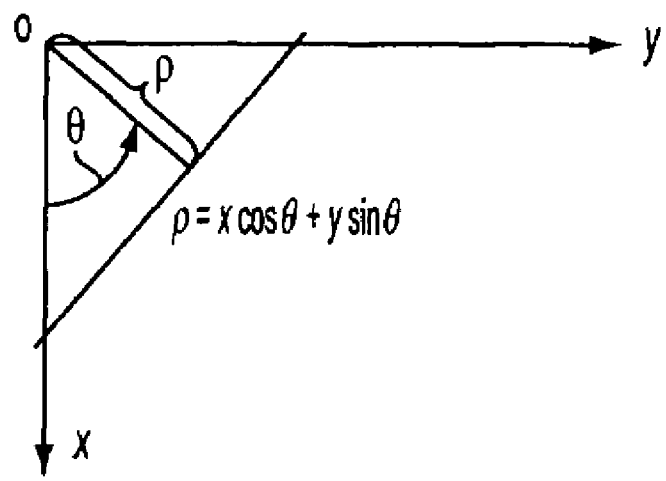
Figure 5B:
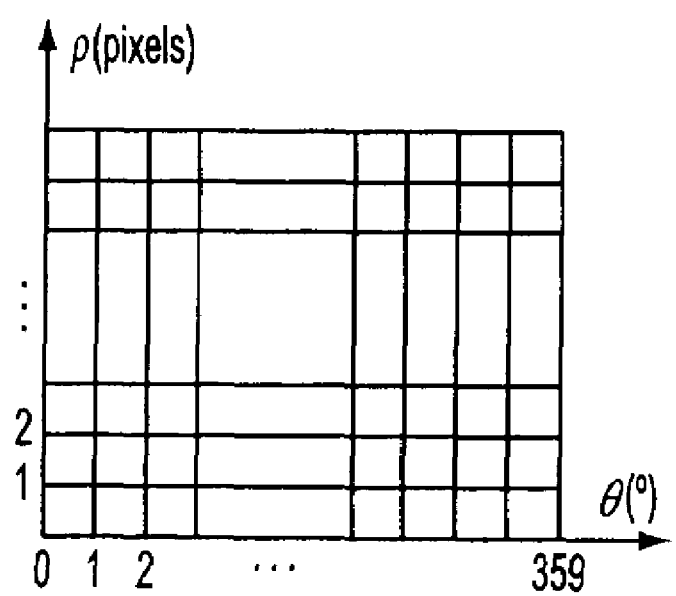

Initially, some background calculations based on the edge data are performed. The mathematical representation of $\rho = i \cos\theta + j \sin\theta$ for lines is used herein as illustrated in FIG. 5(a). For implementation, the parameters $\theta$ and $\rho$ are quantized into discrete intervals as shown in FIG. 5(b). The finer the quantization step, the higher the resolution which can be achieved at the cost of more memory and higher computational complexity. In an exemplary implementation, the quantization resolution is 1 for both parameters, as also shown in the FIG. 5(b), although this can be varied. The maximum value for the parameter $\rho$ is the diagonal distance of the edge map. A projection of an edge $\vec{G}_{i,j}$ onto the parameter space $(\rho,\theta)$ is computed by $$F(\vec{G}, i, j, \rho, \theta) = \begin{cases} w(|\vec{G}|) \cdot |\cos\phi|, & \text{if } |\phi| < \phi_T \\ 0, & \text{otherwise} \end{cases},$$

where w( ) is a continuous and monotonic function, $\phi$ is the angle between the edge and the line and $\phi_T$ is a threshold. A graphical example of such a projection is illustrated in FIG. 5(c). The function w( ) used in an exemplary embodiment is: $w(g)=1-\exp(-|g|/T_g)$, where $T_g$ is a soft threshold. In an exemplary embodiment, these values can be set as $T_g=20$ and $\cos(\phi_T)=0.97$. A modified Hough transform taking into account both edge magnitude and orientation is computed by:

$$H(\rho_m, \theta_n) = \sum_{|\vec{G}_{i,j}|>0} F(\vec{G}, i, j, \rho_m, \theta_n)$$

This computation can be performed as follows. First, set all of the entries of the array $H_{\rho,\theta}$ to zero. Next, for every edge ($|\vec{G}_{i,j}|>0$) at location (i,j) perform the following calculations For $\theta=0$ to 359

Figure 6:
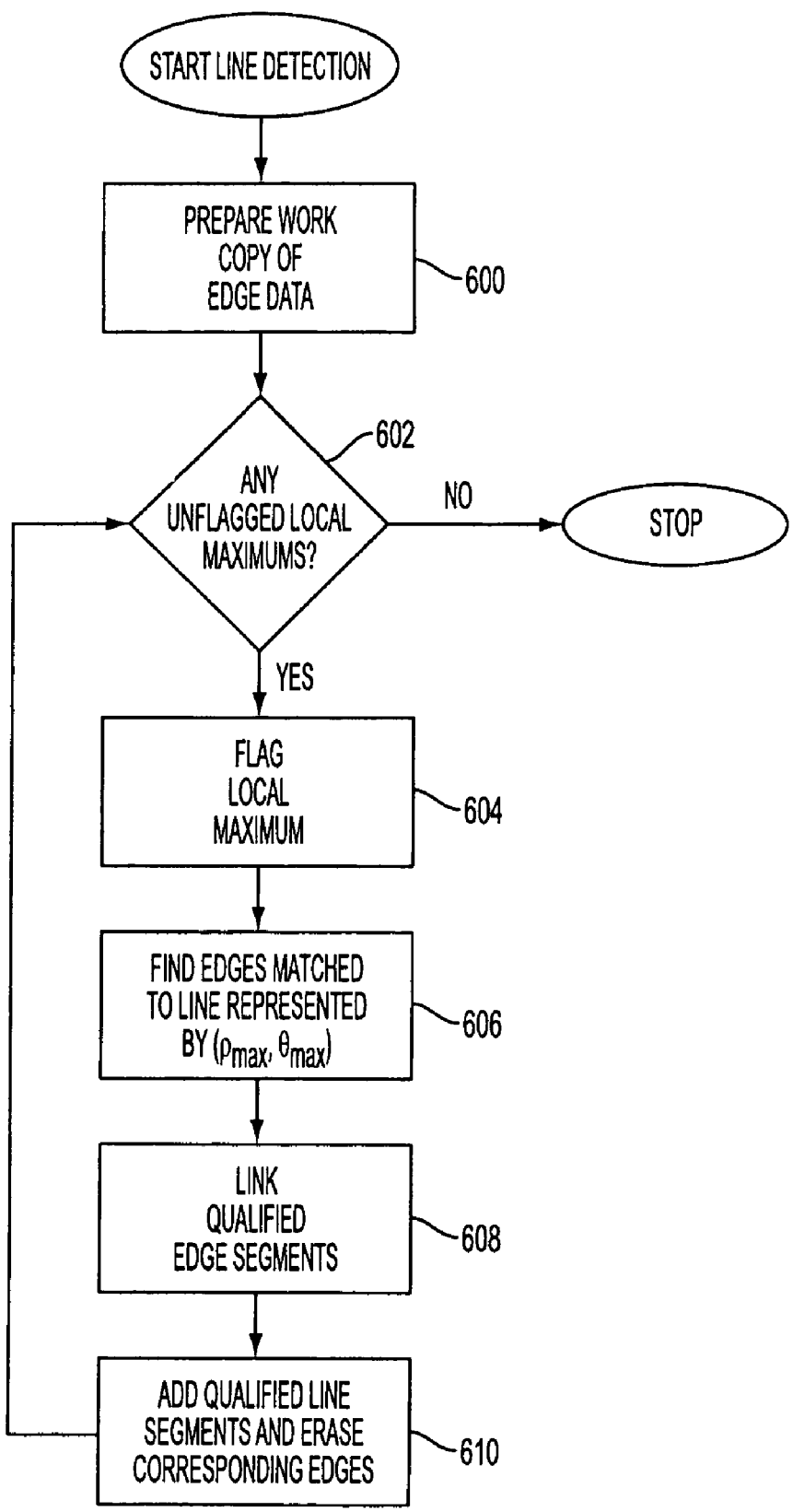
FIG. 6 is a flowchart illustrating a method for line detection according to an exemplary embodiment of the present invention.

$\rho=\lfloor i\cdot\cos\theta+j\cdot\sin\theta+0.5 \rfloor$;

$H_{\rho,\theta} \Rightarrow H_{\rho,\theta}+F(\vec{G},i,j,\rho,\theta)$;

Endfor

Where $\lfloor x \rfloor$ is the floor function, also referred to as the greatest integer function, that returns the largest integer less than or equal to x. Having performed these background calculations, the sub-steps for performing line detection 204 are shown in the flowchart of FIG. 6. Therein, at step 600, a working copy of the edges is prepared for use in the line detection process. Next, at step 602, the line detection (step 204) searches for the largest local maximum $H(\rho_{max},\theta_{max})$ in the parameter space $(\rho,\theta)$ that is larger than a threshold $H_{min}$. $H_{min}$ is proportional to the minimum length of lines expected. A parameter $(\rho,\theta)$ is considered to be a local maximum if the value $H(\rho,\theta)$ is larger than any of its (up to) eight neighbors as illustrated in FIG. 5(d). If no such a local maximum is found, then the process stops. Otherwise the largest local maximum (at $(\rho_{max},\theta_{max})$) is flagged at step 604 by, for example, assigning it to the largest values of its eight neighbors to exclude it from future consideration.

Figure 5G:
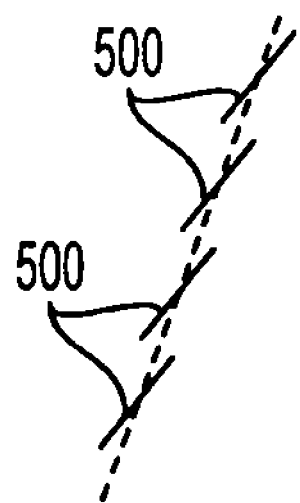

Then, at step 606, edges are located which match the line represented by $(\rho_{max},\theta_{max})$. In finding the matching edges, a horizontal scan in the adjacency D (in pixels) of the line that is close to vertical orientation is performed and the edge closest to the corresponding line point is selected as the matching edge as shown in FIG. 5(e). Likewise, a vertical scan in the adjacency D of the line that is close to horizontal orientation is performed and the edge closest to the corresponding line point is selected as the matching edge as shown in FIG. 5(f). In one exemplary, but purely illustrative, embodiment D=3. Next, at step 608, qualified edge segments are linked together. Edge linking step 608 can be performed in two sub-steps. First, for each connected edge segment having a number of edges greater than a set threshold $T_L$, a minimum-mean-square fitted line $(\rho_f,\theta_f)$ is computed. Additionally, the standard derivation $\sigma_d$ of the displacements, and mean distances $|\bar{d}|$ of the edges to the fitted line are computed. If $|\bar{d}|>\varepsilon$ and $\sigma_d>\delta$ and $|\sin(\theta-\theta_f)|>\sin(\theta_d)$, the edge segment is eliminated from linking. In an exemplary, but purely illustrative, embodiment $\delta=0.5$ and $\theta_d=5°$. This is intended to eliminate the "stair" edge segments 500 illustrated in FIG. 5(g). Next, the gap between two segments is filled in if the gap is shorter (in number of edge pixels) than a given threshold $\Delta$. The pixel locations of the line $(\rho,\theta)$ are used to fill the gaps.

Figure 5H:
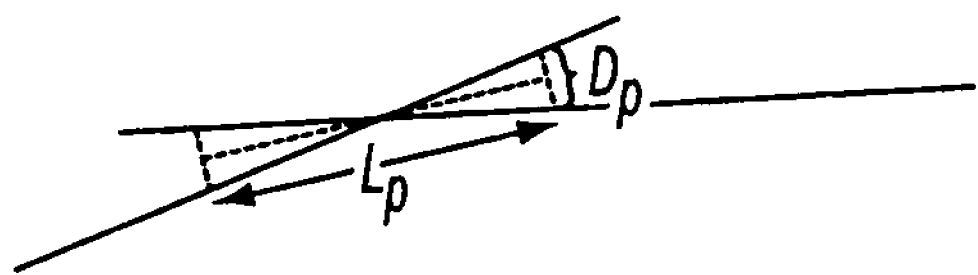

At step 610, qualified line segments are added together to form lines and corresponding edges are then erased. To accomplish this step, edge segments (counting the filled pixels) longer than a predetermined length $L_{min}$ after the edge linking step 608 are considered candidates for combination. Theses candidates are further processed as follows according to this exemplary embodiment. First, a minimum-mean-square line fitting is performed on each segment using only the original edges. Two end points are located. If a candidate edge segment overlaps with an existing line segment by more than a predetermined percentage, e.g., 40% in one purely illustrative, exemplary embodiment, the candidate line segment specified by the fitted line parameters $(\rho_f,\theta_f)$ and two end points is merged into the line currently being identified segment, and the edges associated with the candidate edge segment are erased. The percentage of overlap between and edge segment and a line segment can, for example, be determined as follows. For two segments with a point of intersection, the overlapping length can be defined as the distance between two points along a bisector as illustrated in FIG. 5(h). The two points are selected as those points where a predetermined distance $D_p$ exists between the two segments under consideration. Then, the percentage of overlap can be calculated as the length of overlap divided by the length of the shorter segment. In an exemplary, but purely illustrative, exemplary embodiment, $D_p=1$. The flow then returns to step 602 to continue processing until no more (unflagged) local maximums remain.

In some applications, e.g., such as scanners, lines may coincide with image boundaries and may not be detectable by the above-described exemplary line detection method. Therefore, for some applications, four "virtual" line segments corresponding to the four (top, bottom, left and right) image boundaries may be added to the collection of "real" line segments which were determined using, for example, the line detection method of FIG. 6. Designating image width and height to be W and H, respectively, these four virtual line segments can be specified as $(\rho=0, \theta=0)$, $(\rho=W-1, \theta=90)$, $(\rho=0, \theta=90)$, $(\rho=H-1, \theta=0)$.

Figure 7:
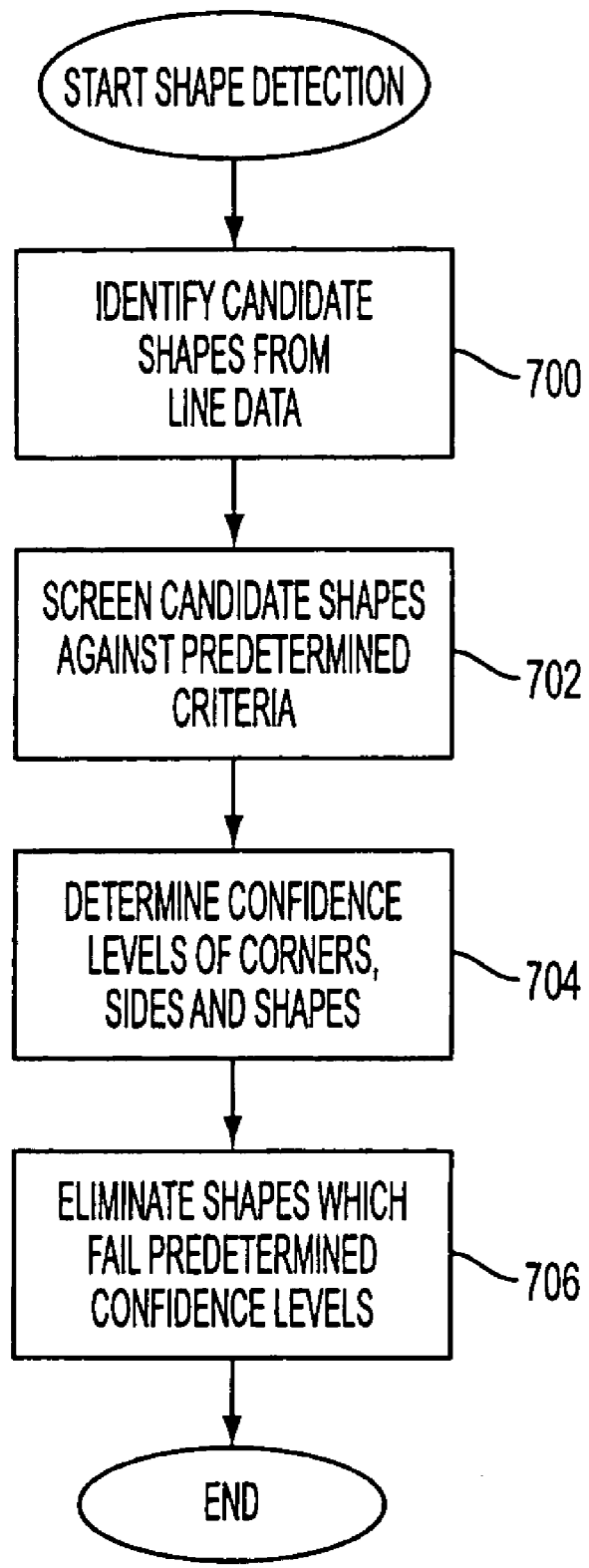
FIG. 7 is a flowchart showing shape (quadrilateral) detection according to an exemplary embodiment of the present invention.

In addition to edge detection and/or line detection, some image processing applications may also perform shape or, more specifically, quadrilateral detection. Referring again to the exemplary image processing technique of FIG. 2, this detection is shown as steps 206 and 208. An exemplary technique for quadrilateral identification and verification (step 206) according to an exemplary embodiment of the present invention is described below and illustrated in the flowchart of FIG. 7. Every four lines may constitute a quadrilateral. From a collection of four virtual and N real lines, the candidate quadrilaterals can be enumerated at step 700 by: (1) selecting four real lines from the set of N, totaling $C_N^4$ quadrilaterals; (2) selecting one virtual line from the set of four and three real lines from the set of N, totaling $C_4^1 \cdot C_N^3$ quadrilaterals; (3) selecting two virtual lines from the set of four and two real lines from the set of N, totaling $C_4^2 \cdot C_N^2$ quadrilaterals; and (4) selecting three virtual lines from the set of four and one real line from the set of N, totaling $C_4^3 \cdot C_N^1$/quadrilaterals. The four virtual lines correspond to the whole image itself and the case is thus trivial. The number of potential quadrilaterals for further verification can then be reduced based on criteria associated with the line information as shown at step 702, which will speed up the quadrilateral detection process. Exemplary criteria for eliminating candidate quadrilaterals include: (1) providing minimum and maximum angles for vertices, (2) providing a maximum distance that a vertex is permitted to be outside the image boundaries, (3) providing a minimum length for each of the four sides of the candidate quadrilateral, (4) providing a minimum area for the candidate quadrilateral and (5) providing a minimum overlap for a line segment relative to the corresponding side of the candidate quadrilateral. Those skilled in the art will appreciate that additional criteria, other criteria or a subset of these criteria can be used to screen the candidate quadrilaterals at step 702.

Figure 8:
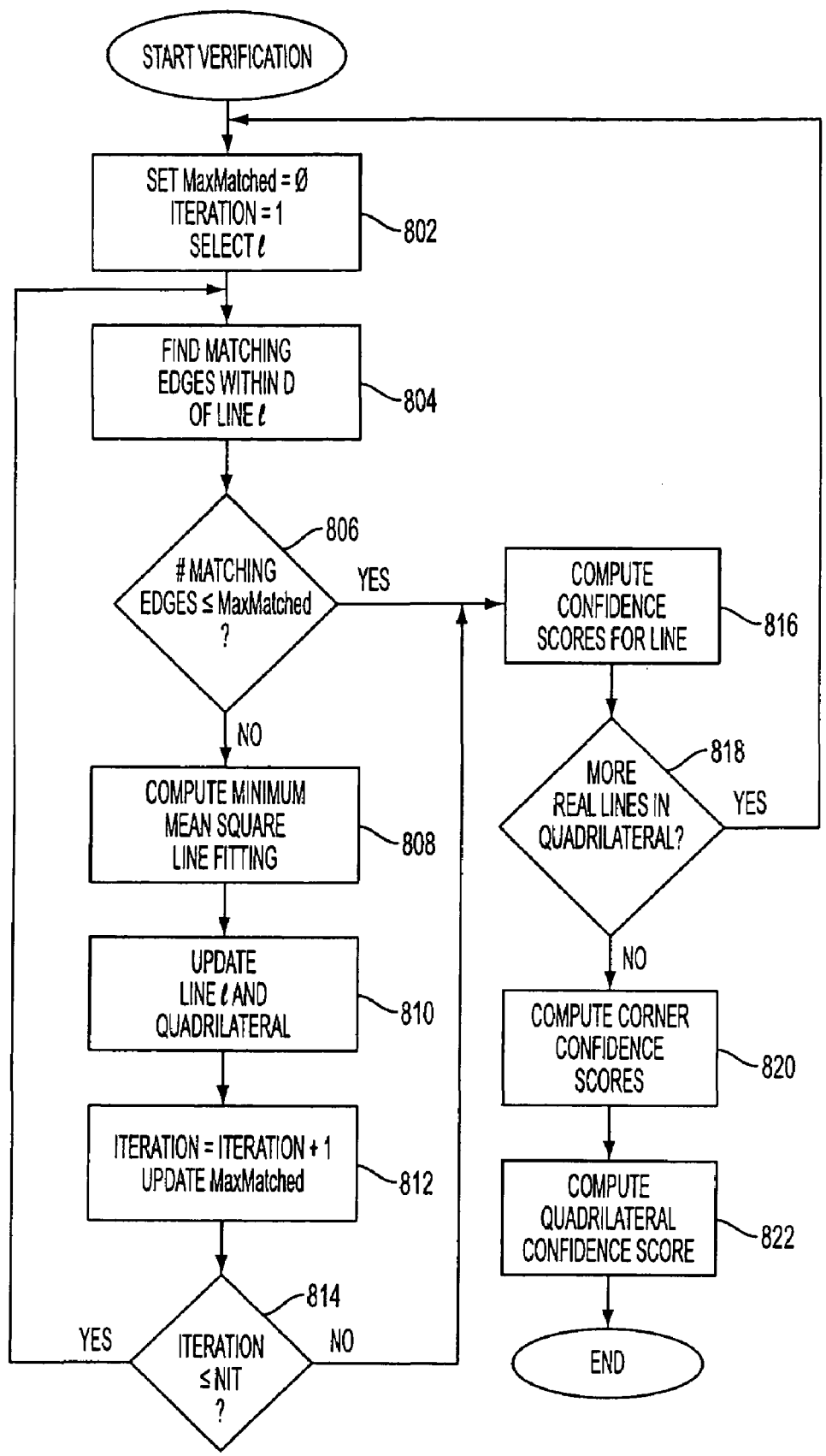
FIG. 8 is a flowchart which illustrates a technique for verifying and refining shape detection according to an exemplary embodiment of the present invention.

Those candidate quadrilaterals which remain after testing against the foregoing (or other) criteria are then subjected to a combined fine-tuning and verification process at step 704. For each quadrilateral, an iterative process of edge matching and tuning is used to adjust the parameters of the quadrilateral to generate a best match. A confidence score (in the range of 0 to 1) is then computed and can be used to further eliminate candidate quadrilaterals. An exemplary method for performing step 704 is illustrated in the flowchart of FIG. 8 for processing the exemplary candidate quadrilateral shown in FIG. 9.

Therein, at step 802, process variables are initialized by setting MaxMatched=0 and iteration=1., For each real line l, at step 804, the matching edges that are closest to a corresponding point in the line l within a set range D and which have an orientation close to the line l's orientation are identified. The distance criteria D can be established using the horizontal and vertical scanning techniques described above with respect to FIGS. 5(e) and 5(f). In one exemplary, but purely illustrative, embodiment D=5. With respect to orientation, the angle between the matching edge under consideration and the line l can be limited to being less than a predetermined angle, e.g., 50° in an exemplary, but purely illustrative, embodiment. If the number of matched edges is more than MaxMatched, at step 806, then the flow moves on to steps 808-814, where the parameters associated with line l are refined. Therein, at step 808, a minimum-mean-square line fitting is computed using the edge locations identified in step 804. The line l is updated with the fitted line as well as the quadrilateral under consideration at step 810, since the change of one side in a quadrilateral will typically result in the change of its corners. The variable iteration is incremented by one at step 812, MaxMatched is updated to reflect the number of matching edges previously identified at step 804 and, if iteration≦nit (e.g., in an exemplary, but purely illustrative, embodiment the limit on refinement passes nit=2), then the flow returns to step 804 where line l is re-evaluated.

When the number of matching edges identified in step 804 is less than or equal to the value stored in MaxMatched or the number of iterations reaches a preset number then the flow follows the path to step 816 for computation of confidence scores. First, confidence scores are computed scores for each real line segment. For example, considering the real line segment AB, in the quadrilateral shown in FIG. 9, three scores are calculated using the following formula:

$$a = \left[ (N+L)/2 - \mu \left( \sum_e d_e^2 \right) \right] / S$$

where N is the number of matched edges, L is the maximum length of linked segments, $d_e$ is the distance of the edge e to the line, μ is a weight and S is the nominal length (in pixels) of the line segment considered. In an exemplary, but purely illustrative, embodiment, μ=0.3. For the example of line segment AB, a score is calculated for side AB, a score is calculated for corner segment $C_{1,1}$ and a score is calculated for corner segment $C_{2,0}$. If there are more real lines to be evaluated for the candidate quadrilateral currently under consideration at step 818, then the flow returns to 802 with a new line l being selected at step 802 and the foregoing process is repeated. Once the four sides of the candidate quadrilateral have been scored, confidence scores for the candidate quadrilateral's four corners (step 820) and the quadrilateral (step 822) as a whole can be computed.

Figure 9:
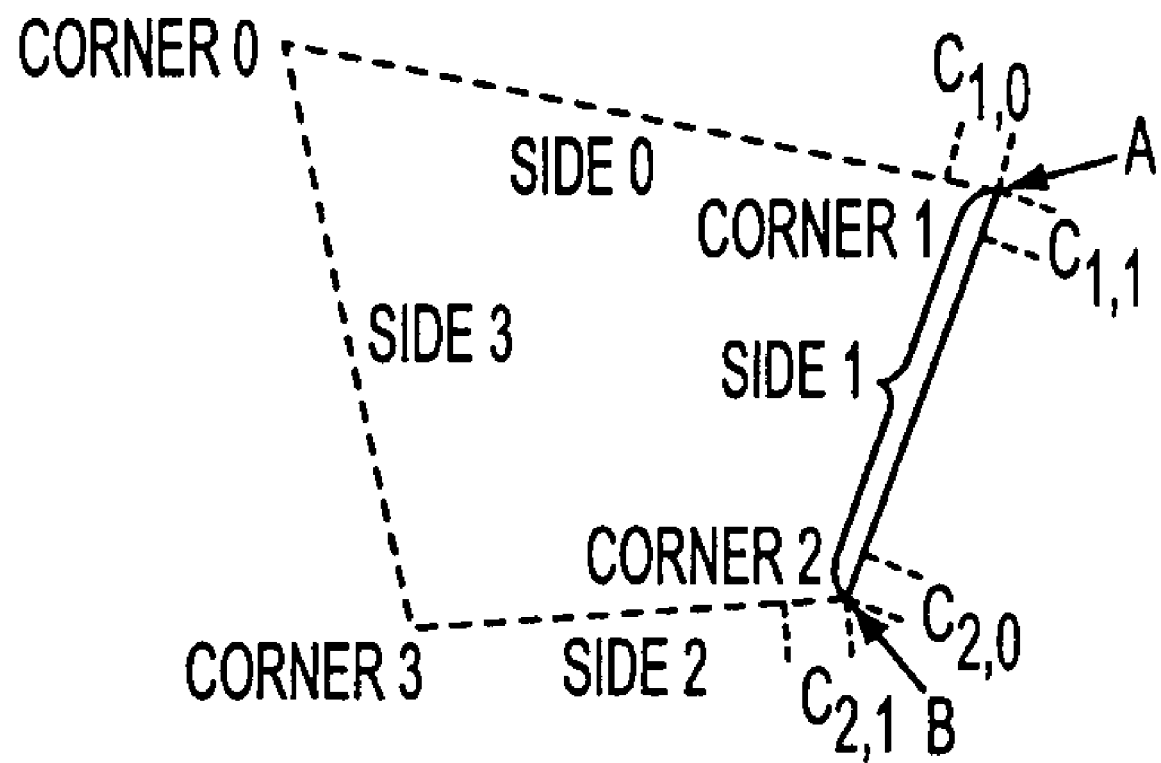
FIG. 9 depicts an exemplary quadrilateral being verified by the technique of FIG. 8.

If the candidate quadrilateral under consideration has a virtual line segment, all of the confidence scores associated with that line segment are set to 1.0 without going through the above process. In computing an overall score for four sides and an overall score for four corners, the presence or absence of virtual lines can be taken into account by exemplary embodiments of the present invention. For example, for quadrilaterals which include one or more virtual lines, exemplary quadrilateral methods and systems according to the present invention can require that quadrilateral's real lines to have higher confidence scores. An exemplary algorithm for performing confidence scoring is provided below. Therein, the sides and corners are indexed in a clockwise order as illustrated in FIG. 9.

```
For the overall side score,
sc = 0; sn = 0; sm = 0;
For side n from 0 to 3
    If this is a real line
        sn ← sn +1;
        If the side score > a set value (e.g., 0.75)
            sc ← sc + the side score;
            sm ← sm +1;
        Endif
    Else    // this is a virtual line
        last = (n+3) mod 4;
        next= (n+1) mod 4;
        if the side scores of the last and the next are over a higher
        value (e.g., 0.9)
            sm ← sm +1;
        endif
    Endif
Endfor
If sn>0
    sc ← sc/sn;
Endif
For the overall corner score,
cc = 0; cn = 0; cm = 0;
For index n from 0 to 3
    last = (n+3) mod 4;
    If this line n is a real line
        cn ← cn + 1;
        if the line last is a real line
            If C_{n,1} > T_{cr} and C_{n,0} > T_{cr}
                cc ← cc + (C_{n,0} + C_{n,1})/2;
                cm ← cm + 1;
            endif
        else
            If C_{n,0} > T_{cv}
                cc ← cc + C_{n,0};
                cm ← cm + 1;
            endif
    else
        if the line last is a real line
            cn ← cn + 1;
            if C_{n,1} > T_{cv}
```

```
              cc ← cc + C_{n,0};
              cm ← cm + 1;
            endif
          else
              cm ← cm + 1;
          endif
       endif
    endfor
```
$T_{cr}$ and $T_{cv}$ are two thresholds. In an exemplary, but purely illustrative, embodiment $T_{cr} = 0.5$ and $T_{cv} = 0.5$.
If cn>0
    cc ← cc/cn;
Endif Finally, the confidence score for the quadrilateral can be computed as:

$$C_q = 0.5 \cdot cc + 0.5 \cdot sc$$

The afore-described confidence scores can be used to eliminate additional candidate quadrilaterals. For example, after all of the remaining candidate quadrilaterals have been scored, another filtering step can be performed by image processing systems and methods according to the present invention wherein quadrilaterals are eliminated if they fail to have (1) a minimum number of corners which exceed a predetermined corner confidence threshold, (2) a minimum number of sides which exceed a predetermined side confidence threshold and/or (3) a minimum overall confidence score q. These criteria can be different for candidate quadrilaterals including at least one virtual line as opposed to candidate quadrilaterals which only include real lines. In an exemplary, but purely illustrative, embodiment the minimum number of passing corners is four, the minimum number of passing sides is four and the minimum confidence q is 0.75 if the quadrilateral contains at least one virtual line. Otherwise, for candidate quadrilaterals having four real lines, the minimum number of passing corners is three, the minimum number of passing sides is four and the minimum confidence q is 0.7.

Figure 10:
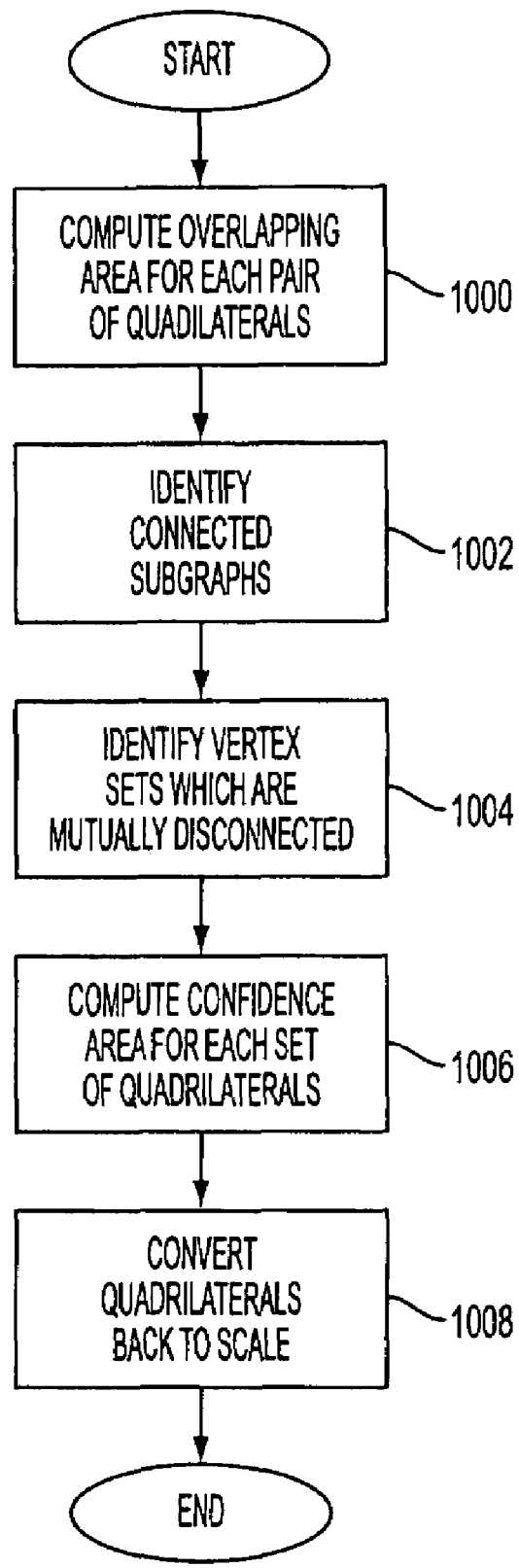
FIG. 10 is a flowchart which describes a method for identifying mutually non-overlapping shapes (quadrilaterals) according to an exemplary embodiment of the present invention.

Since some lines may be contained in multiple quadrilaterals in the enumerative construction process, it is common that some of the quadrilaterals overlap. For some image processing applications only non-overlapping quadrilaterals correspond to targets to be detected. For example, an image may contain a page (constituting a large quadrilateral) which includes several boxes therein (constituting smaller, overlapping quadrilaterals). It may be desirable to distinguish the page from the smaller boxes within the scanned image. Accordingly, other exemplary embodiments of the present invention provide for image processing systems and methods which generate a set of mutually non-overlapping quadrilaterals and enable selection of a particular set based on predetermined criteria, as shown in the flowchart of FIG. 10. Therein, at step 1000, the overlapping area is computed between every pair of N quadrilaterals. This computation can be accomplished using, for example, the algorithms found in Section 7.6, "Intersection of Convex Polygons", of the book *Computational Geometry in C*, authored by Joseph O'Rourke, Cambridge University Press, 1998, the disclosure of which is incorporated here by reference. A pair of quadrilateral overlaps if the computed area is non-zero.

Figures 11A, 11B:
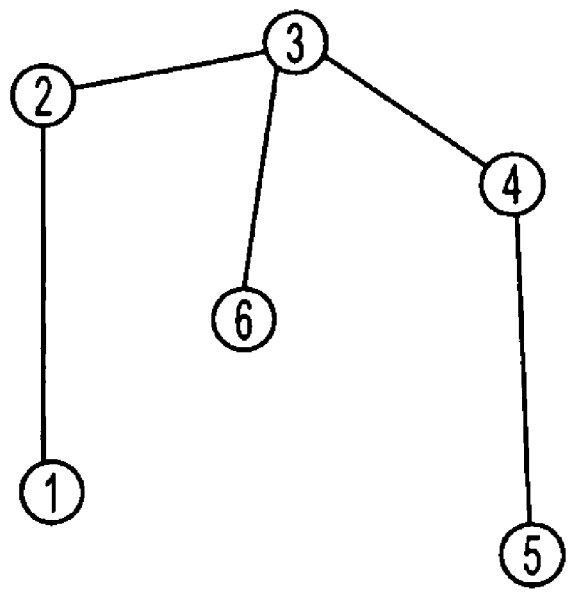
FIGS. 11(a)-11(b) show an exemplary undirected graph and adjacency matrix, respectively, associated with the method of FIG. 10.

An undirected graph can be used to represent the overlap relationships among the N quadrilaterals. A vertex represents a quadrilateral and an edge between two vertices represents an overlap. An undirected graph can be represented by an adjacency matrix M where $M_{i,j}$ having a value of one (or zero) represents the existence of an edge (or no edge) between vertices i and j. An exemplary undirected graph and its corresponding adjacency matrix are shown in FIGS. 11(a) and 11(b), respectively. Once the undirected graph and/or its corresponding adjacency matrix are created for all quadrilaterals, the connected sub-graphs are identified at step 1002. This identification can be accomplished by using a depth-first search as described, for example, in Section 7.3.1, "Depth-First Search" in the book entitled *Introduction to Algorithms*, authored by Udi Manber, published by Addison-Wesley (1989).

Next, for each sub-graph, all sets of vertices that are mutually disconnected (i.e., those sub-graphs which have no edge between any pair of vertices) are identified at step 1004. For the example of FIG. 11(a), such mutually disconnected sets are: (1), (2), (3), (4), (5), (6), (1,3), (1,4), (1,5), (1,6), (2,4), (2,5), (2,6), (1,3,5), (1,4,6), (1,5,6), (2,4,6) and (2,5,6). In addition all sets that are not completely contained in another set are identified. In the example of FIG. 11(b) such sets are: (1,3,5), (1,4,6), (1,5,6), (2,4,6) and (2,5,6). For each set of quadrilaterals corresponding to the vertex sets, a total effective area (TEA) is computed as $$TEA = \sum_n q_n \cdot area_n$$

at step 1006 and the set with the largest value is selected as part of the detected quadrilaterals. Note that this latter step enables selection of the larger overlapping quadrilateral from the smaller overlapping quadrilaterals in this example, however other applications may use different criteria to identify different quadrilaterals/quadrilateral sets. Finally, for all detected quadrilaterals, a conversion is performed to convert them to the same scale as the original image by multiplying the line parameter p and corner coordinates by the sub-sampling factor N (if sub-sampled).

Systems and methods for image processing according to exemplary embodiments of the present invention can be performed by one or more processors executing sequences of instructions contained in a memory device (not shown). Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. Various alternatives are also contemplated by exemplary embodiments of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for image processing in an image processing system, the method comprising the steps of:
   determining, for each of a plurality of different color channels, a channel gradient and a weighting factor associated with each color channel in an image, determining being performed by a processor of the image processing system;
   setting, for each pixel, a color gradient equal to one of said channel gradients having a maximum weighted magnitude based on said weighting factors, setting being performed by the processor;
   preliminarily identifying edges in said image using said color gradients; and
   confirming said edges using at least one threshold.

2. The method of claim 1, wherein said step of determining, for each of a plurality of different color channels, a channel gradient and a weighting factor associated with each color channel in an image further comprises the step of:
   using, as said weighting factor, a non-linear weighting factor.

3. The method of claim 2, wherein said non-linear weighting factor is computed as:
   $w_{i,j}^c = \lambda e^{-\sigma^2/\mu}$, wherein $w_{i,j}^c$ refers to said non-linear weighting factor associated with pixel (i,j) in color channel c, $\lambda$ and $\mu$ are constants and $\sigma$ is a standard deviation of channel gradient orientations within an L-by-L window centered at (i,j) and with magnitude $M_{i,j}^c$ over a threshold $t = kM_{i,j}^c$.

4. The method of claim 1, wherein said plurality of different color channels further comprise a red channel (r), a green channel (g) and a blue channel (b).

5. The method of claim 1, wherein said step of confirming said edges using at least one threshold further comprises the steps of:
   identifying a first pixel having a color gradient magnitude which exceeds a first threshold; and
   confirming, as edge pixels, pixels which neighbor said first pixel, if said neighboring pixels have a color gradient magnitude which exceeds a second threshold and if said neighboring pixels have an orientation difference which is less than an orientation threshold.

6. The method of claim 1, further comprising the step of:
   detecting, based upon said confirmed edges, lines within said image.

7. The method of claim 6, wherein said step of detecting lines within said image further comprises the step of:
   computing a Gradient Weighted Hough Transform based on, among other things, edge strength and orientation.

8. The method of claim 6, further comprising the step of:
   identifying quadrilaterals within said image using said detected lines.

9. The method of claim 8, further comprising the step of:
   selecting a set of mutually non-overlapping quadrilaterals from said identified quadrilaterals.

10. A computer-readable medium containing a program that performs the steps of:
    determining, for each of a plurality of different color channels, a channel gradient and a weighting factor associated with each color channel in an image;
    setting, for each pixel, a color gradient equal to one of said channel gradients having a maximum weighted magnitude based on said weighting factors;
    preliminarily identifying edges in said image by using said color gradients; and
    confirming said edges using at least one threshold.

11. The computer-readable medium of claim 10, wherein said step of determining, for each of a plurality of different color channels, a channel gradient and a weighting factor associated with each color channel in an image further comprises the step of:
    using, as said weighting factor, a non-linear weighting factor.

12. The computer-readable medium of claim 11, wherein said non-linear weighting factor is computed as:
    $w_{i,j}^c = \lambda e^{-\sigma_c^2/\mu}$, wherein $w_{i,j}^c$ refers to said non-linear weighting factor associated with pixel (i,j) in color channel c, $\lambda$ and $\mu$ are constants and $\sigma$ is a standard deviation of channel gradient orientations within an L-by-L window centered at (i,j) and with magnitude $M_{i,j}^c$ over a threshold $t = kM_{i,j}^c$.

13. The computer-readable medium of claim 10, wherein said step of confirming said edges using at least one threshold further comprises the steps of:
    identifying a first pixel having a color gradient magnitude which exceeds a first threshold; and
    confirming, as edge pixels, pixels which neighbor said first pixel, if said neighboring pixels have a color gradient magnitude which exceeds a second threshold and if said neighboring pixels have an orientation difference which is less than an orientation threshold.

14. An image processing system comprising:
    an image capture device for capturing an image; and
    a processor, connected to said image capture device, for determining, for each of a plurality of different color channels, a channel gradient and a weighting factor associated with each color channel in an image; setting, for each pixel, a color gradient equal to one of said channel gradients having a maximum weighted magnitude based on said weighting factors; preliminarily identifying edges in said image by using said color gradients; and confirming said edges using at least one threshold.

15. The image processing step of claim 14, wherein said processor employs, as said weighting factor, a non-linear weighting factor.

16. The image processing system of claim 15, wherein said non-linear weighting factor is computed as:
    $w_{i,j}^c = \lambda e^{-\sigma c2/\mu}$, wherein $w_{i,j}^c$ refers to said non-linear weighting factor associated with pixel (i,j) in color channel c, $\lambda$ and $\mu$ are constants and $\sigma_c$ is a standard deviation of channel gradient orientations within an L-by-L window centered at (i,j) and with magnitude $M_{i,j}^c$ over a threshold $t = kM_{i,j}^c$.

17. The image processing system of claim 14, wherein said processor confirms said edges by identifying a first pixel having a color gradient magnitude which exceeds a first threshold; and confirming, as edge pixels, pixels which neighbor said first pixel, if said neighboring pixels have a color gradient magnitude which exceeds a second threshold and if said neighboring pixels have an orientation difference which is less than an orientation threshold.

18. An image processing system comprising:
    means for capturing an image; and
    means, connected to said image capture device, for determining, for each of a plurality of different color channels, a channel gradient and a weighting factor associated with each color channel in an image; setting, for each pixel, a color gradient equal to one of said channel gradients having a maximum weighted magnitude based on said weighting factors; preliminarily identifying edges in said image by using said color gradients; and confirming said edges using at least one threshold.

19. A method of image processing, the method comprising:
    identifying a first plurality of candidate shapes in an image based on line data, the image being provided by an image capture device;

screening said first plurality of candidate shapes against predetermined criteria to generate a second plurality of candidate shapes;

determining at least one confidence level for each of said second plurality of candidate shapes; and eliminating those of said second plurality of candidate shapes wherein said at least one confidence level is less than a predetermined value to generate a set of confirmed shapes, wherein identifying, screening, determining and eliminating are performed by a processor that accesses a memory device of an image processing system.

20. The method of claim 19, wherein said first and second plurality of candidate shapes are candidate quadrilaterals.

21. The method of claim 19, wherein said predetermined criteria include at least one of: minimum vertex angle values, maximum vertex angle values, maximum distance of a vertex outside image boundaries, minimum side length, minimum shape area, and minimum overlap between a detected line segment and a corresponding side of a shape.

22. The method of claim 19, wherein said step of determining at least one confidence level for each of said second plurality of candidate shapes further comprises the step of:

determining confidence levels for sides and corners of each candidate shape and using said side and corner confidence levels to determine said shape confidence levels.

23. The method of claim 19, wherein said predetermined value is one of: a predetermined side confidence level, a predetermined corner confidence value and a predetermined shape confidence value.

24. The method of claim 19, further comprising the steps of:

identifying a plurality of sets of mutually non-overlapping shapes from said set of confirmed shapes; and selecting, from said plurality of sets of mutually non-overlapping shapes, a set of mutually non-overlapping shapes having a largest total effective area.

25. A computer-readable medium containing a program that performs the steps of:

identifying a first plurality of candidate shapes in an image based on line data;

screening said first plurality of candidate shapes against predetermined criteria to generate a second plurality of candidate shapes;

determining at least one confidence level for each of said second plurality of candidate shapes; and eliminating those of said second plurality of candidate shapes wherein said at least one confidence level is less than a predetermined value to generate a set of confirmed shapes.

26. The computer-readable medium claim 25, wherein said first and second plurality of candidate shapes are candidate quadrilaterals.

27. The computer-readable medium of claim 25, wherein said predetermined criteria include at least one of: minimum vertex angle values, maximum vertex angle values, maximum distance of a vertex outside image boundaries, minimum side length, minimum shape area, and minimum overlap between a detected line segment and a corresponding side of a shape.

28. The computer-readable medium of claim 25, wherein said step of determining at least one confidence level for each of said second plurality of candidate shapes further comprises the step of:

determining confidence levels for sides and corners of each candidate shape and using said side and corner confidence levels to determine said shape confidence levels.

29. The computer-readable medium of claim 25, wherein said predetermined value is one of: a predetermined side confidence level, a predetermined corner confidence value and a predetermined shape confidence value.

30. The computer-readable medium of claim 25, further comprising the steps of:

identifying a plurality of sets of mutually non-overlapping shapes from said set of confirmed shapes; and selecting, from said plurality of sets of mutually non-overlapping shapes, a set of mutually non-overlapping shapes having a largest total effective area.

31. An image processing system comprising:

an image capture device for capturing an image; and a processor for identifying a first plurality of candidate shapes in said image based on line data; screening said first plurality of candidate shapes against predetermined criteria to generate a second plurality of candidate shapes; determining at least one confidence level for each of said second plurality of candidate shapes; and eliminating those of said second plurality of candidate shapes wherein said at least one confidence level is less than a predetermined value to generate a set of confirmed shapes.

32. The system of claim 31, wherein said first and second pluralities of candidate shapes are candidate quadrilaterals.

33. The system of claim 31, wherein said predetermined criteria include at least one of: minimum vertex angle values, maximum vertex angle values, maximum distance of a vertex outside image boundaries, minimum side length, minimum shape area, and minimum overlap between a detected line segment and a corresponding side of a shape.

34. The system of claim 31, wherein said processor determines confidence levels for sides and corners of each candidate shape and uses said side and corner confidence levels to determine said shape confidence levels.

35. The system of claim 31, wherein said predetermined value is one of: a predetermined side confidence level, a predetermined corner confidence value and a predetermined shape confidence value.

36. The system of claim 31, wherein said processor identifies a plurality of sets of mutually non-overlapping shapes from said set of confirmed shapes; and selects, from said plurality of sets of mutually non-overlapping shapes, a set of mutually non-overlapping shapes having a largest total effective area.

37. A system for image processing comprising:

means for identifying a first plurality of candidate shapes in an image based on line data;

means for screening said first plurality of candidate shapes against predetermined criteria to generate a second plurality of candidate shapes;

means for determining at least one confidence level for each of said second plurality of candidate shapes; and means for eliminating those of said second plurality of candidate shapes wherein said at least one confidence level is less than a predetermined value.

38. The method of claim 1, wherein the weighting factor is proportional to a non-linear function associated with a pixel (i,j) in a color channel of the plurality of different color channels, and the non-linear function has a variable that corresponds to a standard deviation of channel gradient orientations, and the standard deviation is computed for pixels within an L-by-L window centered at (i,j) and having a magnitude larger than a predefined threshold.

* * * * *

UNITED STATES PATENT AND TRADEMARK OFFICE
CERTIFICATE OF CORRECTION

| | | |
|---|---|---|
| PATENT NO. | : 7,672,507 B2 | Page 1 of 1 |
| APPLICATION NO. | : 10/768461 | |
| DATED | : March 2, 2010 | |
| INVENTOR(S) | : Jian Fan | |

It is certified that error appears in the above-identified patent and that said Letters Patent is hereby corrected as shown below:

In column 13, line 26, in Claim 3, delete "and a" and insert -- and σ --, therefor.

In column 14, line 10, in Claim 12, delete "and a" and insert -- and σ --, therefor.

In column 15, line 50, in Claim 26, after "medium" insert -- of --.

Signed and Sealed this
Twenty-seventh Day of November, 2012

David J. Kappos
*Director of the United States Patent and Trademark Office*